United States Patent [19]

Metz

[11] 4,436,763

[45] Mar. 13, 1984

[54] METHOD OF PLATING A WIRE WITH METAL

[75] Inventor: Paul Metz, Luxembourg, Luxembourg

[73] Assignee: Arbed S/A, Luxembourg

[21] Appl. No.: 459,197

[22] Filed: Jan. 19, 1983

[30] Foreign Application Priority Data

Jan. 26, 1982 [LU] Luxembourg .............................. 83897

[51] Int. Cl.³ .............................................. B05D 3/14
[52] U.S. Cl. ...................................... 427/47; 427/117; 427/431; 427/433; 427/434.5; 427/434.6; 427/436
[58] Field of Search ................. 427/47, 117, 431, 433, 427/434.5, 434.6, 436

[56] References Cited

U.S. PATENT DOCUMENTS 4,228,200 10/1980 Sander et al. ......................... 427/436
4,236,230 11/1980 Thompson .............................. 427/47

Primary Examiner—Bernard D. Pianalto

Attorney, Agent, or Firm—Karl F. Ross; Herbert Dubno

[57] ABSTRACT

A plating method comprises the steps of melting the metal and forming a bath of the molten metal, and displacing a strand to be plated longitudinally through the molten-metal bath so the strand leaves the bath at a surface thereof. Thus the molten metal of the bath sticks to the strand and forms a molten metallic layer thereon. A helicoidal, that is at least generally helical or corkscrew-shaped, magnetic field generally centered on the strand is formed and positioned to exert on the metallic layer a magnetic force generally parallel to the strand and on the conductive metallic bath a rotary force centered on the strand. The field is polarized to exert the magnetic force upward to thicken the layer on the strand and is polarized oppositely to exert the magnetic force downward to thin the layer on the strand. The rotary action on the bath serves to move any impurities floating on the bath outward away from the rising strand. Similarly the kneading action of the helicoidal field smoothes the molten-metal layer on the strand so it is of uniform thickness.

6 Claims, 1 Drawing Figure

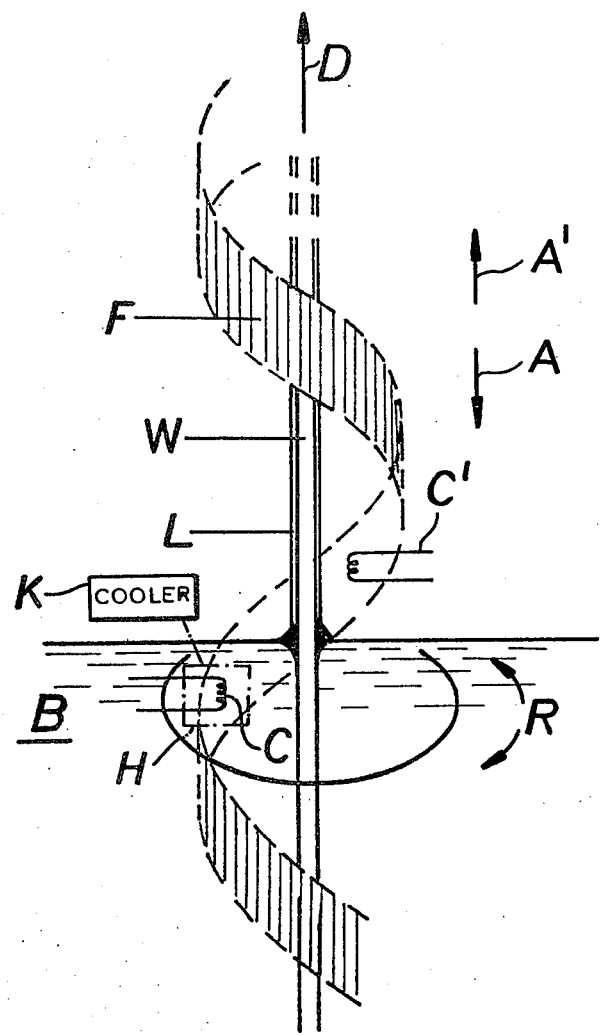

METHOD OF PLATING A WIRE WITH METAL

FIELD OF THE INVENTION

The present invention relates to metal plating. More particularly this invention concerns the plating of a wire with metal.

BACKGROUND OF THE INVENTION

It is standard practice to plate a strand, which term can cover a compact-section element such as a wire or a noncompact-section element such as a tube or sheet, with a metal by passing the strand through a bath of the molten plating metal. A layer of the plating metal sticks to the strand and hardens thereon.

Such a procedure can be done with a workpiece constituted of a pure metal such as steel or copper, of an alloy such as brass, or even on a nonmetallic strand such as graphite, glass, or the like, so long as the molten metal sticks to the workpiece strand. The plating metal can be a pure metal such as copper, zinc, aluminum, chromium, lead, or tin, or can be an alloy. A standard such process is the galvanizing of wire, in which a rustable ferrous wire is covered with zinc. It is also possible for such a procedure to be used to build up a wire or strand of one metal by plating it with the same metal so as to increase the cross section.

The main problem with such plating of a strand is the thickness of the plated layer formed. Minor changes in viscosity or local variations in surface tension can produce thick and/or thin spots. Obviously a good-quality product must be plated uniformly.

OBJECTS OF THE INVENTION

It is therefore an object of the present invention to provide an improved metal-plating method.

Another object is the provision of such a metal-plating method which overcomes the above-given disadvantages.

A further object is to provide a method of plating a metal on a strand which allows a very uniform coating of the plating metal to be formed on the strand.

SUMMARY OF THE INVENTION

These objects are attained according to the instant invention in a plating method comprising the known steps of melting the metal and forming a bath of the molten metal, and displacing the strand longitudinally through the molten-metal bath so the strand leaves the bath at a surface thereof. Thus, as is known, the molten metal of the bath sticks to the strand and forms a molten metallic layer thereon. According to the invention a helicoidal, that is at least generally helical or corkscrew-shaped, magnetic field generally centered on the strand is formed and positioned to exert on the metallic layer a magnetic force generally parallel to the strand and on the conductive metallic bath a rotary force centered on the strand. The field is polarized in accordance with desired layer thickness.

According to the invention the wire exits upward from the bath. The field is polarized to exert the magnetic force upward to thicken the layer on the strand and is polarized oppositely to exert the magnetic force downward to thin the layer on the strand. When the force is upward it acts with the normal adhesion between the hard strand or wire and against gravity to draw additional metal up out of the bath, and when it is downward it acts with gravity and against this adhesion to push the metal on the strand back down into the bath.

The rotary action on the bath serves to move any impurities floating on the bath outward away from the rising strand. Similarly the kneading action of the helicoidal field smoothes the molten-metal layer on the strand so it is of uniform thickness.

The field according to this invention can be formed mainly above the bath or to both sides of the location on the bath surface where the strand exits from the bath. It can even be induced wholly from below the bath surface.

In accordance with another feature of this invention the bath is cooled adjacent the location at which the strand exits from it. To this end the field is formed by a coil partially immersed in the bath at the location. Thus cooling the coil cools the bath. The coil in this case can be held in a chilled housing immersed in the bath, or could be formed of a tubular conductor through which a coolant flows. Either way cooling the bath at this location increases the viscosity of the molten metal, making a thicker coating possible.

According to this invention the strand is a compact-section wire, that is of circular or regular-polygonal section, and the field is substantially helical. The wire exits vertically from the bath and the coil forming the field is centered on it.

DESCRIPTION OF THE DRAWING

The above and other features and advantages will become more readily apparent from the following, reference being made to the accompanying drawing whose sole FIGURE is a diagrammatic illustration of the invention.

SPECIFIC DESCRIPTION

As seen in the drawing a wire W is displaced upward in a direction D out of a bath of a molten metal. Here for instance the bath B is of zinc and the wire W is of steel for galvanization. As the wire moves up out of the bath B a layer L of the molten metal adheres to it. This layer L hardens as the wire W moves up.

According to the present invention a helical magnetic field F is formed which is centered on the strand which can extend both above and below the surface of the bath B. The field F is formed by a multipolar coil, two of whose pole coils C and C', one below and the other above the level of the bath B are illustrated schematically. The coils of such an inductor would lie on a helical line centered on the longitudinal axis of the longitudinally moving wire W. The field F can be polarized either to exert on the conductive metallic layer L on the wire W a force in the direction A parallel to the direction D but opposite thereto, or in an opposite direction A'.

The field F is polarized to exert, according to Fleming's Rule, the force in the direction A when the layer L is to be thinned, as such force will push the liquid layer L back down into the bath B. The field F is oppositely polarized when the layer L is to be thicker, as such a force will effectively counter gravity and draw the molten metal out of the bath B.

The helical field F can also impart rotation as indicated by arrow R to the liquid of the bath. This rotation, which is centered on the strand W on which the field F is centered, centrifugally moves impurities floating on the bath B outward away from the wire W. As a result the natural tendency of any such particles to be picked up by the rising wire W is completely countered, producing a layer L substantially free of inclusions. It should be noted that any impurities in the bath B normally come from the wire W and either sink out of harm's way to the bottom of the vessel holding the bath, or float on the surface.

According to this invention the coils C underneath the liquid level of the bath B are held in housings H connected to units K that cool them. Such cooling not only prevents the considerable heat of the bath B from destroying the field-making equipment, but also increases the viscosity of the molten metal of the bath at the location where the strand W leaves it. As a result substantially more metal can be plated on the wire than is normally possible.

The helical field F serves not only to control the thickness of the layer L, but also gently works or kneads this layer L so that nearly perfectly uniform thickness is imparted to it. Thus the instant invention allows a very uniform product to be made.

I claim:

1. A method of plating a strand with a metal, the method comprising the steps of:
   melting the metal and forming a bath of the molten metal;
   displacing the strand longitudinally through the molten-metal bath so the strand leaves the bath at a surface thereof, whereby the molten metal of the bath sticks to the strand and forms a molten metallic layer thereon;
   forming around the strand generally at the surface a helicoidal magnetic field generally centered on the strand and positioned to exert on the metallic layer a magnetic force generally parallel to the strand and on the bath a rotary force generally centered on the strand; and
   polarizing the field in accordance with desired layer thickness.

2. The strand-plating method defined in claim 1 wherein the field is formed around the strand to both sides of the location at which it exits the bath.

3. The strand-plating method defined in claim 1 wherein the wire exits upward from the bath, the field being polarized to exert the magnetic force upward to thicken the layer on the strand and being polarized oppositely to exert the magnetic force downward to thin the layer on the strand.

4. The strand-plating method defined in claim 1, further comprising the step of
   cooling the bath adjacent the location at which the strand exits from it.

5. The strand-plating method defined in claim 1 wherein the strand is a compact-section wire and the field is substantially helical.

6. The strand-plating method defined in claim 1 wherein the field is formed by a coil partially immersed in the bath at the location, the method further comprising the step of
   cooling the coil and thereby also cooling the bath adjacent the location at which the strand exits from it, whereby the viscosity of the molten metal is increased at the location around the strand.

* * * * *